United States Patent [19]
Stöferle et al.

[11] 4,168,160
[45] Sep. 18, 1979

[54] ARRANGEMENT FOR MEASURING AND/OR MONITORING AN AXIAL FORCE

[76] Inventors: Theodor Stöferle, Traubenstrasse 29, D-6104 Seeheim; Wolfhard Sack, Vor der Grube 3, D-6101 Weiterstadt, both of Fed. Rep. of Germany

[21] Appl. No.: 843,795

[22] Filed: Oct. 20, 1977

[30] Foreign Application Priority Data

Oct. 25, 1976 [DE] Fed. Rep. of Germany ....... 2648192

[51] Int. Cl.² .................................................. G01L 5/12
[52] U.S. Cl. ...................................................... 75/140
[58] Field of Search .................. 73/133 R, 140, 141 A

[56] References Cited
U.S. PATENT DOCUMENTS 2,367,017  1/1945  Gardiner ................................. 73/140
3,082,621  3/1963  Söderholm ........................... 73/88 R

FOREIGN PATENT DOCUMENTS 1381946  1/1975  United Kingdom ................... 73/133 R
372463   5/1973  U.S.S.R. ..................................... 73/140

OTHER PUBLICATIONS

Abbott et al., Agard Memorandum–Rome Agard Conference, Dec. 1952, p. 50.

Primary Examiner—Charles A. Ruehl
Attorney, Agent, or Firm—Michael J. Striker

[57] ABSTRACT

An arrangement for measuring and/or monitoring an axial force applied to a shaft-like member having an axis and supported in a housing by at least one roller bearing, comprises an inner sleeve-shaped element receiving the roller bearing of the shaft-like member and having two end portions spaced from one another in an axial direction, an outer element connected with the housing of the shaft-like member, and an elastically deformable web arranged at at least one of the end portions of the inner element so as to support the latter in the outer element, and provided with strain sensors. The strain sensors may include strain gauges and the like. The elastically deformable webs may be arranged on both end portions of the inner element. The inner element, the outer element and the webs may together form an integral member.

21 Claims, 16 Drawing Figures

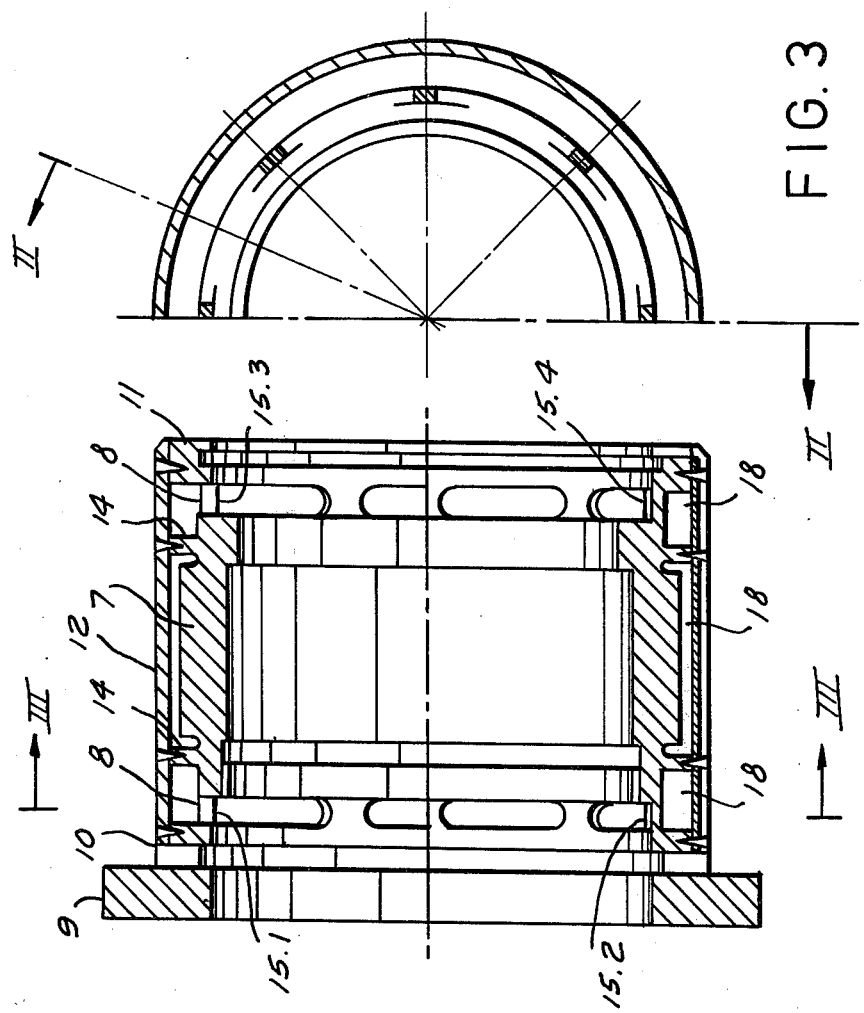
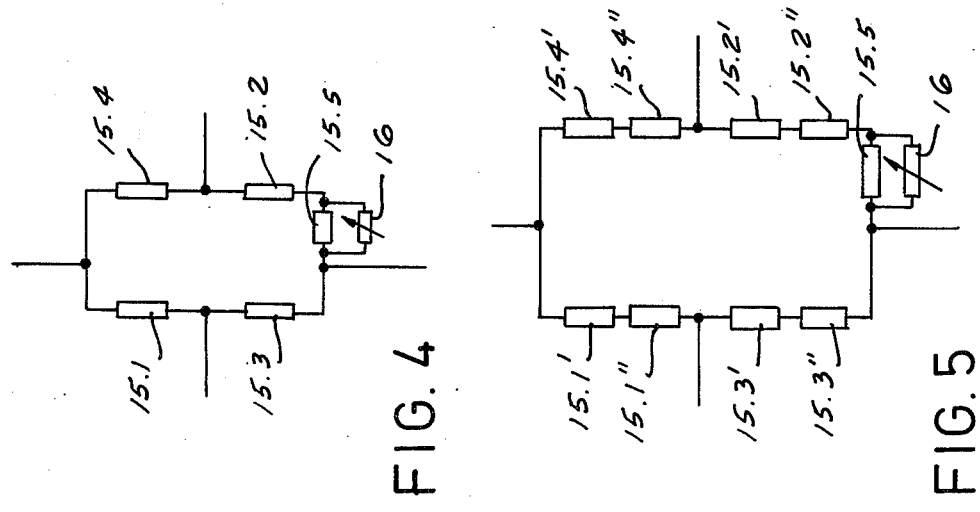

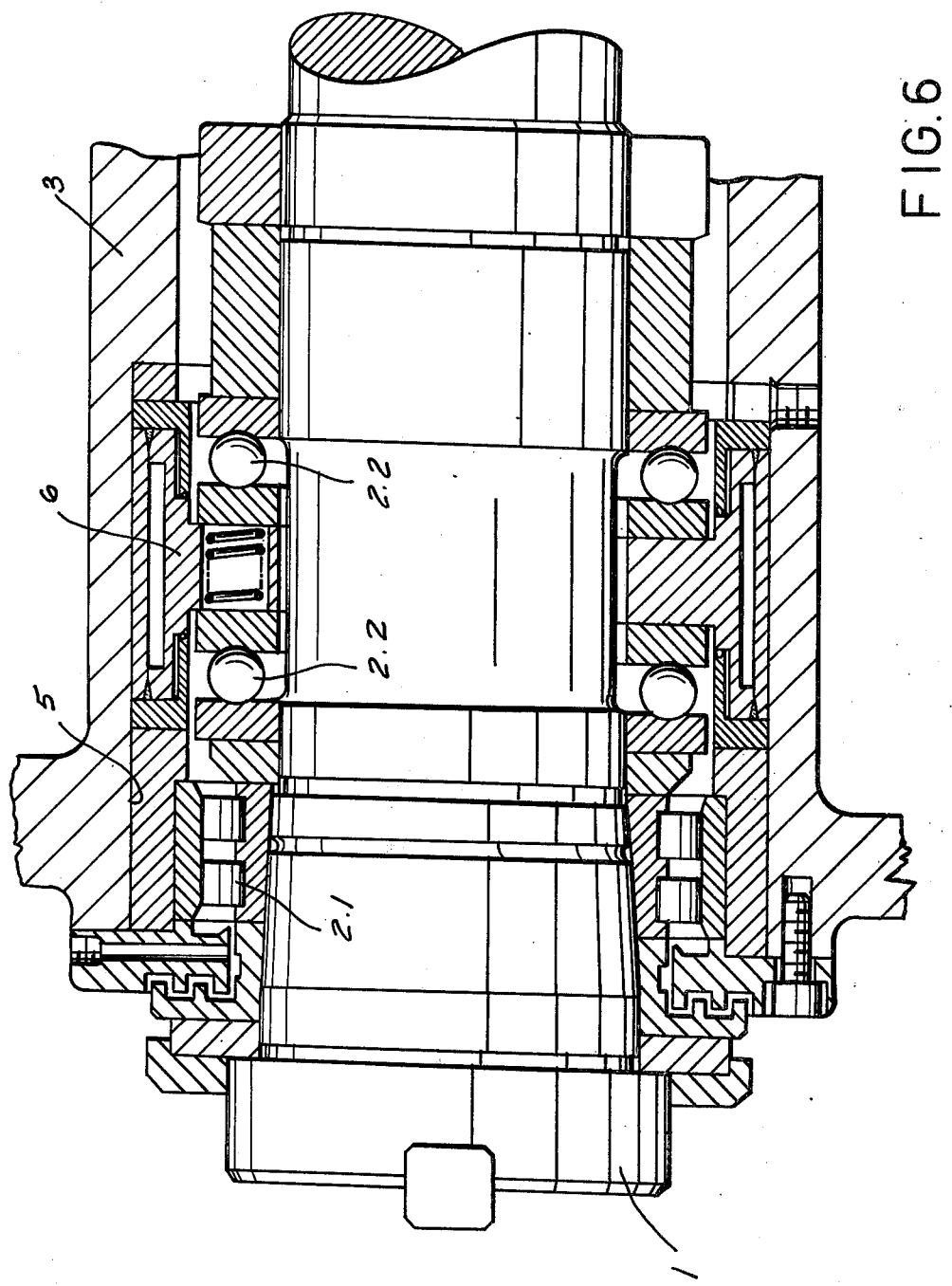

ARRANGEMENT FOR MEASURING AND/OR MONITORING AN AXIAL FORCE

BACKGROUND OF THE INVENTION

The present invention relates to an arrangement for measuring and/or monitoring an axial force applied to a shaft-like member such as a tool spindle of a machine tool.

The invention particularly relates to an arrangement for measuring and/or monitoring a force produced during feeding of a tool in material-removing operations, when the feeding is performed in the direction of an axis of a tool spindle, such as in drilling, abrading with conical tools and countersinking. Further fields of use of the present invention are those wherein variations of the axial force can serve as a characteristic of an operation.

Measurement and/or monitoring of an axial force applied to a tool spindle of a machine tool is very important in many cases. During material-removing operations the axial force is related to an axial component of a force on a cutting edge. An increase of the axial force serves for instance as an indication of an increased wear particularly on a main cutting edge. For this reason the axial force is considered as a certain characteristic of an operation so that information about the axial force can be used during the operation in self-adaptive control, that is, in a system for automatic optimization of operation-control action.

Arrangements for measuring an axial force have been proposed in the art. One known measuring arrangement includes a ring-shaped measuring element which is received in a spindle housing and located between an outer ring of a bearing of a spindle head and an associated axial stop face. This arrangement is not suitable for the above objects inasmuch as a direct contact of the outer ring of the bearing with a bore of the spindle housing produces a frictional force which considerably affects the output measurement by introduction of hysteresis effects.

SUMMARY OF THE INVENTION

Accordingly, it is an object of the present invention to provide an arrangement for measuring and/or monitoring an axial force applied to a shaft-like member, which avoids the disadvantages of the prior art.

More particularly, it is an object of the present invention to provide an arrangement for measuring and/or monitoring an axial force applied to a shaft-like member, which measures or monitors the axial force with a higher accuracy as compared with prior art arrangements.

Another object of the present invention is to provide an arrangement for measuring and/or monitoring an axial force applied to a shaft-like member, which is formed as a closed unit mountable independently from the structure of a bearing and having characteristics which are not affected by a mode of mounting of the shaft-like members such as a tool spindle.

Still another object of the present invention is to provide an arrangement for measuring and/or monitoring an axial force of a shaft-like member, which is compact and occupies a comparatively small space.

In keeping with these objects, and with others which will become apparent hereinafter, one feature of the present invention resides, briefly stated, in an arrangement for measuring and/or monitoring an axial force applied to a shaft-like member supported in a housing by a roller bearing, which arrangement has an inner sleeve-shaped element receiving the bearing, an outer element connected with a housing, and an elastically deformable web at one end of the inner element, provided with strain sensing elements and supporting the inner element in the outer element.

The thus-constructed arrangement is formed as a closed unit which can be mounted independently from a construction of the bearing and has characteristics which are not affected by a mode of mounting of the shaft-like member, such as a tool spindle of a machine tool. Therefore, the arrangement operates with a comparatively higher accuracy. At the same time, the arrangement occupies a very small space, so that no substantial changes have to be made in the machine tool. For instance, an insignificant increase of a receiving bore of the spindle housing suffices for mounting of the present arrangement therein. The strain sensing elements may include strain gauges, piezoelectric or other electromechanical means for transforming deformation of the web into signals to be subsequently sensed or measured.

The arrangement in accordance with the present invention may be mounted where desired with small construction and labor expenditures so that, on the one hand, the deformation of a respective part thereof is sufficiently great for generating a necessary signal, and, on the other hand, the rigidity of the elastically deformable web is sufficiently great for supporting the spindle bearing in the axial direction. It has been shown that optimization of the above-mentioned mutually opposed requirements is an essential criterion in the case when an axial force has to be sensed or measured in practice.

When the present arrangement is used for detecting the axial force on the tool spindle, it performs essential protective functions of various types. The machine tool or at least the feed of the tool spindle can be switched off when the feed force reaches an upper permissible limit. Therefore, breakage of the tool is prevented, which otherwise could occur as a result of overloading or inadmissably high wear. Furthermore, later damage is also prevented, which otherwise could occur as a result of unexpected and unpredicted breakage of a tool, when for instance a drilling operation is continued after damage to the tool and the tool and/or a workpiece can be broken, or when fine working operation is performed in a not finished bore leading to breakage of a fine tool.

The arrangement in accordance with the present invention also increases the degree of achievable automatization. The improved protection and automatic processing of a measuring signal require less personnel involvement. Means for controlling axial movement of the spindle can be simplified or eliminated inasmuch as an increase in axial force is automatically sensed. During drilling of through bores a drop in axial force at the end of a drilling operation can be used as a signal for reversal to the rapid feed.

In adaptive control systems an axial force signal is processed in an automatic control circuit for improving or optimizing material-removing operations for economic reasons. For instance an axial feed can be so controlled that a sufficiently great material removal rate can be balanced against sufficient service life of the tool.

The protective functions of the arrangement are performed not only during working of a workpiece, but also in a so-called secondary time. Damage resulting from human error or malfunctions in automatic programs (for instance delays in switching-off a rapid feed) can also be prevented.

Another feature of the present invention is that the arrangement may have two elastically deformable webs connecting two end portions of the inner element with the outer element. The inner element, the outer element and the webs of the arrangement may form an integral member.

Still another feature of the present invention is that the integral member may be formed as a hollow cylinder concentric with the axis of the spindle and having openings, and that the webs may be formed between the openings of the cylinder.

In accordance with a further feature of the present invention annular diaphragms may be provided connecting the inner element with the outer element and extending in a radial direction.

A still further feature of the present invention is that hollow spaces are formed between parts of the outer element, such as an outer sleeve-shaped member and outer side members, and the diaphragms, on one hand, and the inner element and the webs, on the other hand.

Connecting means may be provided for connecting the sleeve-shaped member with the side members and the diaphragms, including electronic or photonic welds.

An additional feature of the present invention is that the webs may be located axially between the inner element and the side members of the outer element and may include a plurality of portions each having two end sections connected with the inner element by a first connecting web portion and to the outer element by a second connecting web portion.

Finally, the webs may be formed as portions of a meander-shaped bellows.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a longitudinal section of the arrangement used with the spindle bearing shown in FIG. 1;

FIG. 3 is a section taken along the line III—III in FIG. 2, wherein the direction of section shown in FIG. 2 is identified by the line II—II;

FIG. 4 is a view showing a circuit for strain gauges mounted in the arrangement shown in FIG. 1;

FIG. 5 is a view showing another possible circuit for the strain gauges mounted in the arrangement shown in FIG. 1;

FIG. 6 is a view showing another construction of the spindle bearing with arrangement differing from that shown in FIG. 1;

DESCRIPTION OF PREFERRED EMBODIMENTS

Figure 1:
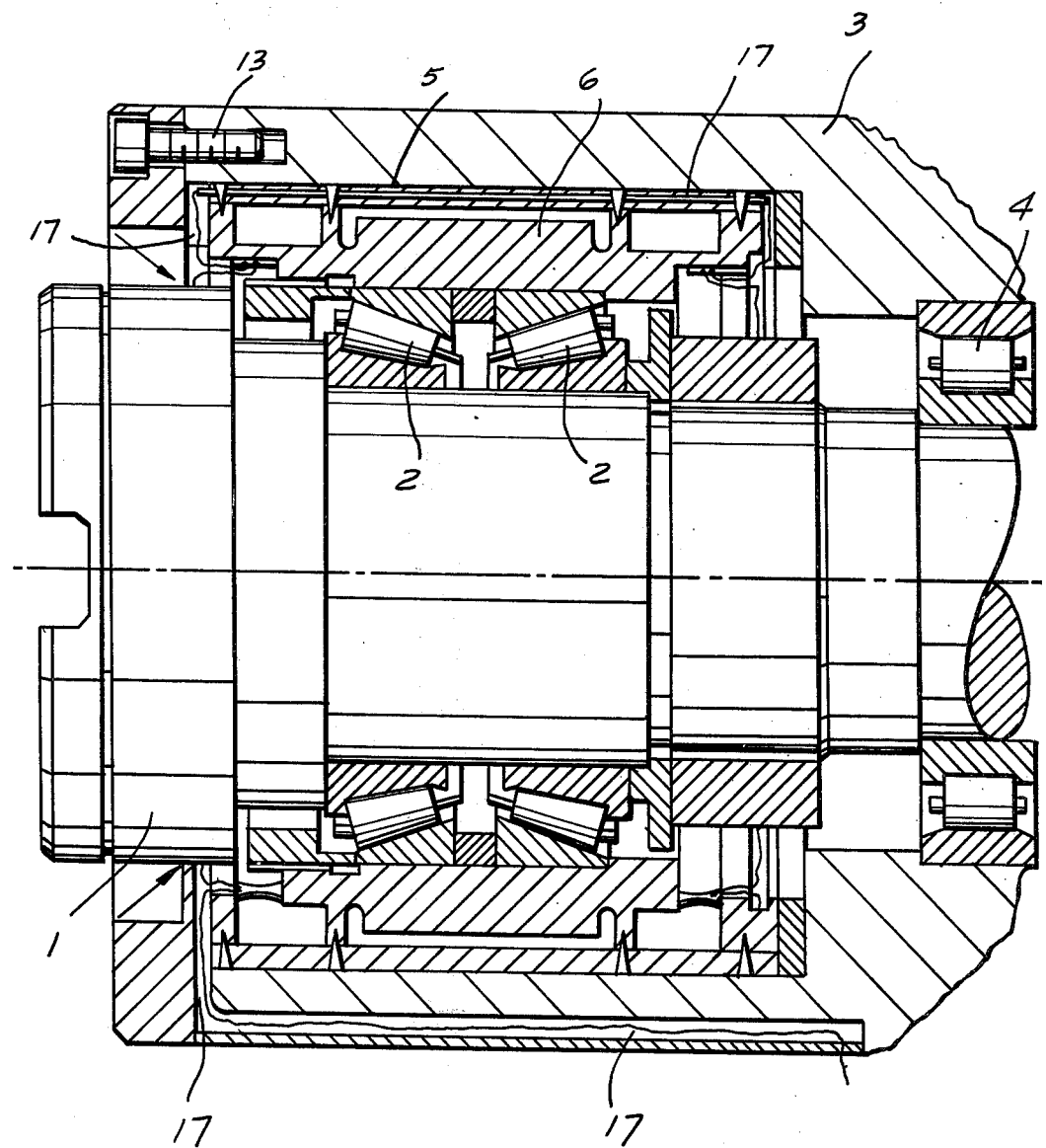
FIG. 1 is a section of a spindle bearing of a machine tool with an arrangement for measuring and/or monitoring an axial force applied thereto, in accordance with the present invention.

FIG. 1 shows a spindle of a machine tool such as a drilling machine or a drilling unit. The spindle 1 receives a not-shown tool and is supported in a spindle housing 3 by a bearing 2, or in the shown construction by two radial axial conical roller bearings. A cylindrical roller bearing 4 is further provided between the spindle 1 and the spindle housing 3.

A measuring arrangement 6 is located between the spindle bearing 2 and a bore 5 in the spindle housing 3, which arrangement is shown in particular in FIGS. 2 and 3. The measuring arrangement 6 includes a substantially cylindrical inner sleeve-shaped element 7 receiving the spindle bearing 2, which inner element is connected at both its axial ends by elastically deformable webs 8 with a front ring 10 provided with a flange 9 and with a rear ring 11. The rings 10 and 11 together with an outer sleeve 12 form an outer element of the measuring arrangement inserted in the bore 5. Bolts 13 connect the flange 9 of the arrangement 6 with the spindle housing 3.

Annular diaphragms 14 are arranged adjacent to the axial ends of the inner element 7 and are made of one piece therewith. The diaphragms 14 extend in a radial direction relative to the axis of the spindle. The annular diaphragms, as well as the rings 10 and 11 are connected with the outer sleeve 12 for instance by electronic welding. As can be seen in FIG. 2, the thus-formed weld seams are comparatively small and deeply extend into the material. Instead of the electronic welding, other methods of connecting may be used, such as soldering, bolting, shrinking and the like.

Strain gauges 15.1, 15.2, 15.3 and 15.4 are mounted on the elastically deformable webs 8. FIG. 2 shows a circuit for the strain gauges in which strain gauges 15.1 and 15.2 are subjected to tensional stresses, whereas the strain gauges 15.3 and 15.4 are subjected to compression stresses under the action of an axial force applied to the spindle 1.

FIG. 4 shows the strain gauges 15.1, 15.2, 15.3 and 15.4 connected with one another so as to form a so-called full bridge. In order to avoid errors which can occur as a result of bending of the spindle, the strain gauges 15.3 and 15.4 are offset relative to one another by 180° with respect to the spindle axis in the circumferential direction of the arrangement. An additional temperature sensing resistor 15.5 is provided in the circuit for the purpose of temperature compensation. The resistor 15.5 is arranged at a point in the arrangement which is not subjected to strain. Time-dependent temperature variations act upon the resistor and the latter can be used to perform temperature compensation to the extent desired. In order to adjust the temperature compensation the resistor 15.5 is connected in parallel with an adjustable resistor 16.

Connecting wires for the strain gauges are located in passages 17 of the measuring arrangement and of the inner element 7. Hollow spaces 18 are formed between the outer sleeve 12 and the inner element 7, and may be filled with heat conducting material for improving and accelerating the temperature compensation in the interior of the measuring arrangement. A cooling liquid can also be fed into the hollow spaces 18 for cooling the measuring arrangement.

FIG. 5 shows another possible circuit for the strain gauges. In comparison with the bridge circuit of FIG. 4, eight strain gauges are provided here instead of four strain gauges, and each of the strain gauges of FIG. 4 is divided into two strain gauge, e.g., the strain gauges 15.1 is divided into two strain gauges 15.1' and 15.1" and so on. The two strain gauges 15.1' and 15.1" and so on of each arm may be offset relative to one another by 180° with respect to the spindle axis in the circumferential direction of the arrangement. Diagonally opposite bridge arms provided the strain gauges 15.1', 15.1" and with 15.2', 15.2" are offset relative to one another by 90°. This construction further reduces the errors caused by bending and axial impact of the bearing, and by signal noise caused by the latter, that is by a portion of waves not generated by the variations to be measured. It is to be understood that a greater number of strain gauges may be provided, which number depends for instance upon the number of elastically deformable webs 8.

In the embodiment shown in FIGS. 1–5 centering of the inner element 7 connected with the bearings 2 of the measuring arrangement 6 is performed by the annular diaphragms 14 which are deformable in the axial direction, but are rigid in the radial direction of the arrangement. Radial force transmitted from the spindle bearings 2 is absorbed in the spindle housing 3 through the diaphragms 14.

When the spindle bearing is so constructed, as shown in FIG. 6, that the radial force is borne by a front bearing such as a cylindrical roller bearing 2.1 in the spindle housing 3 so that this bearing does not or does not substantially transmit axial force, it is possible to use a spindle bearing which is purely axial, such as an axial bearing 2.2. In the embodiment shown in FIG. 6 (and also in FIG. 16) the inner element 7 has a supporting ring portion 7.1 located between two axial bearings 2.2. Since in this embodiment radial guiding of the inner element 7 is not necessary, no annular diaphragms and the like are provided in the arrangement. The inner element 7 is connected with the outer parts 10, 11 and 12 of the arrangement only by the elastically deformable webs 8. The arrangement does not have a flange similar to the flange 9 of FIG. 2, inasmuch as the arrangement 6 is arrested in the bore 5 of the spindle housing.

Figure 7:
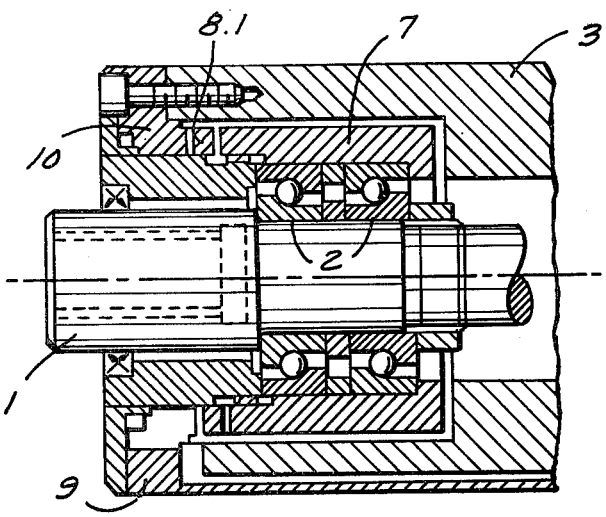
FIG. 7 is a view showing a further construction of the spindle bearing with a further arrangement associated therewith.
Figure 8:
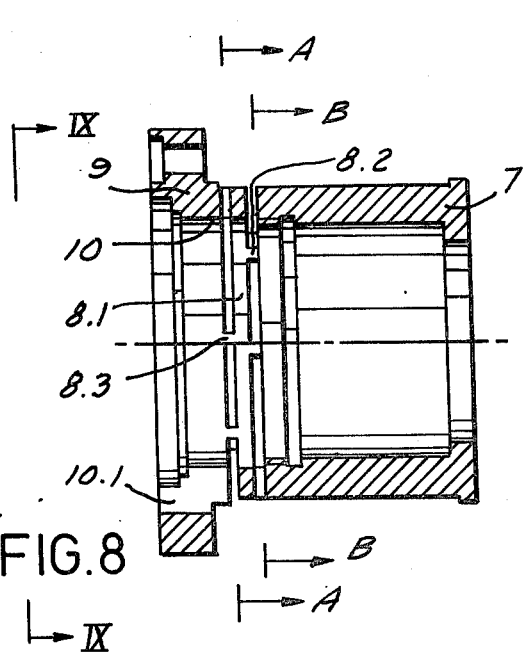
FIG. 8 is a longitudinal section of the arrangement used with the spindle bearing shown in FIG. 7.

Another embodiment of the invention is shown in FIG. 7. The inner element 7 is here connected only at its one axial end with the ring 10 and the flange 9 forming the outer element of the arrangement. The elastically deformable webs are formed as portions of a deformable ring 8.1 axially extending between the inner element 7 and the outer members 9, 10 so that each of the thus-formed ring portions is connected at its one end with the inner element 7 by a connecting web 8.2, and is connected at its other end with the outer members 9, 10 by a connecting web 8.3. As can be seen in FIG. 8, the entire arrangement is formed as an integral member, and the deformable ring 8.1 and the connecting webs 8.2 and 8.3 are defined between slot-like openings.

Figure 9:
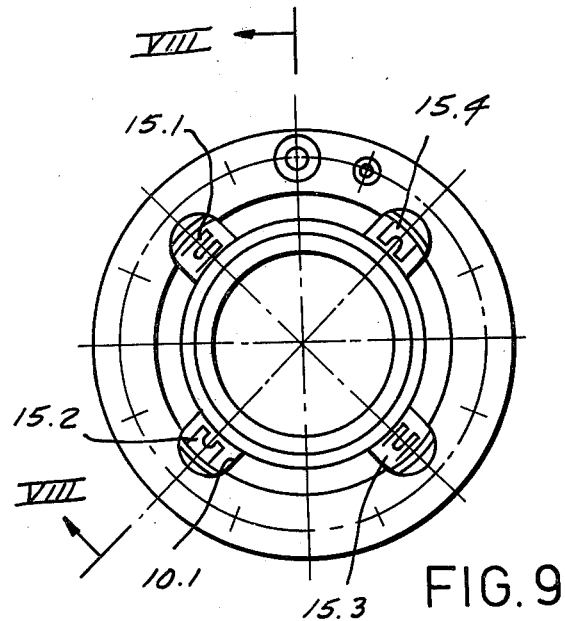
FIG. 9 is a side view taken along the line IX—IX in FIG. 8, wherein the direction of the sections shown in FIGS. 7 and 8 is identified by the line VIII—VIII.
Figure 10:
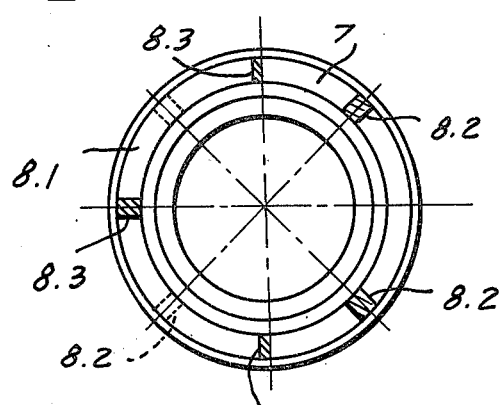
FIG. 10 is a view showing in the left half a section along the line A—A and in the right half a section along the line B—B of FIG. 8.
Figure 11:
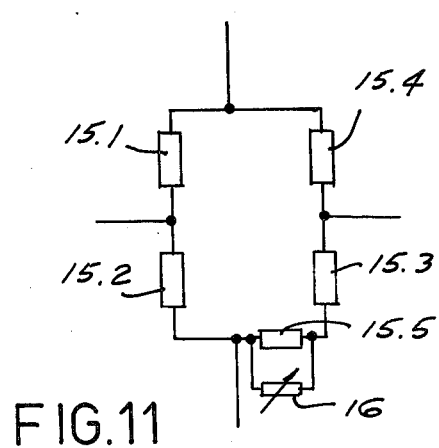
FIG. 11 is a simplified view showing a strain-gauge circuit mounted in the arrangements shown in FIGS. 7-10.

Contrary to the previously described embodiments, the portions of the deformable ring 8.1 are leaf springs so that the strain gauges 15.1, 15.2, 15.3 and 15.4 must be mounted on front faces of the deformable ring 8.1. It can be seen from the direction of turning of the strain gauges in FIG. 9, that the strain gauges 15.1 and 15.3 are active, e.g., they change their resistance under the action of deformation of the ring 8.1. The strain gauges 15.2 and 15.4 are passive, e.g., they do not change their resistance under the action of deformation of the ring 8.1. As shown in FIG. 9, recesses 10.1 are provided in the ring 10 in order to mount the strain gauges on the ring 8.1. It can also be seen that the several portions forming the elastically deformable web extend from the connecting web 8.2 to the connecting web 8.3 for a portion of a circumference equal to 45°. A circuit for the strain gauges shown in FIG. 11 corresponds to the circuit shown in FIG. 4, but forms a so-called half-bridge, inasmuch as the strain gauges 15.2 and 15.4 are passive.

Figure 12:
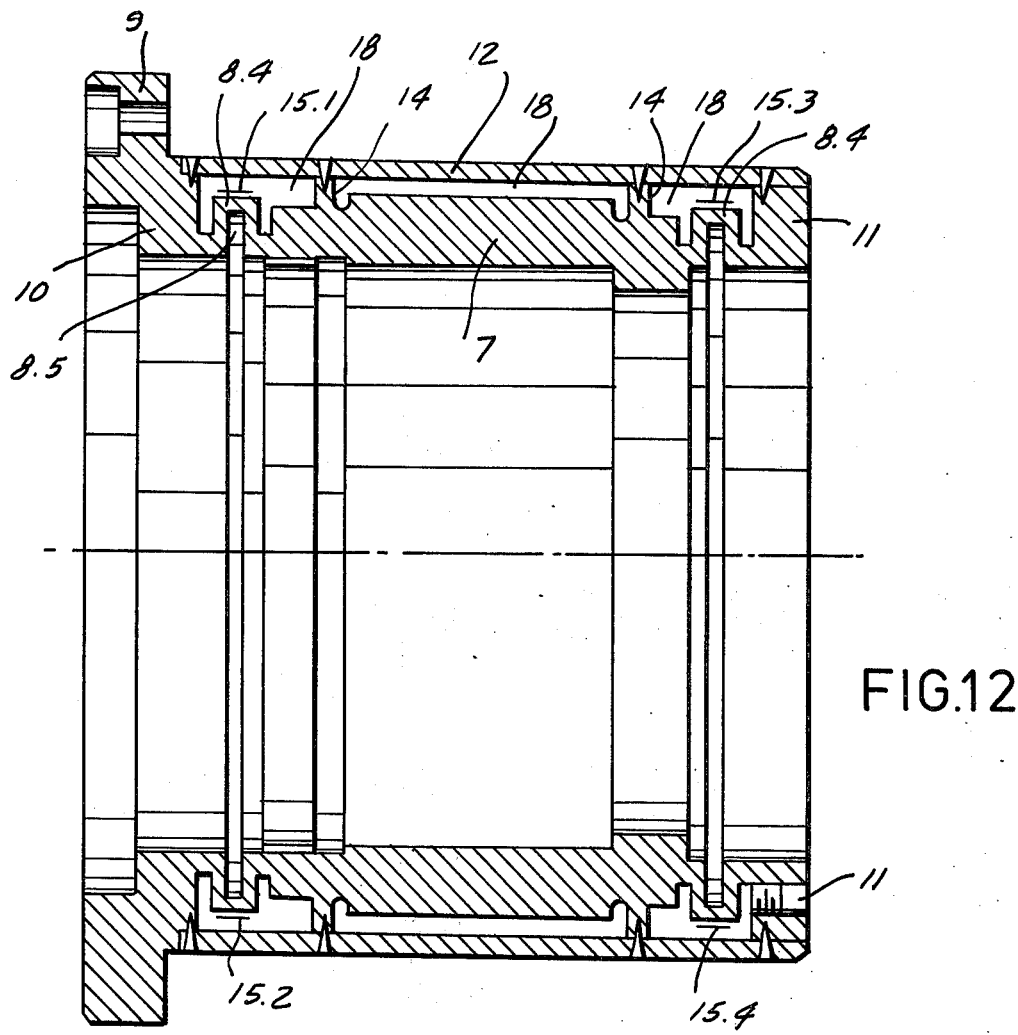
FIG. 12 is a section showing an arrangement in accordance with a further embodiment of the present invention.
Figure 13:
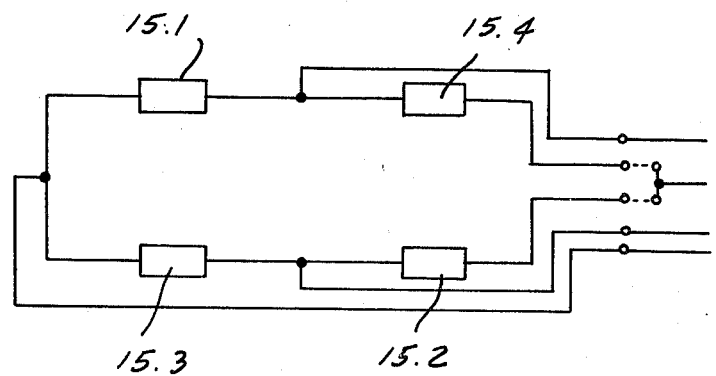
FIG. 13 is a schematic view showing a circuit of strain gauges used in arrangement shown in FIG. 8.

In the measuring arrangement shown in FIG. 12 the elastically deformable webs 8 of FIG. 2 are located between openings (longitudinal holes) of a preferably thin-walled hollow cylinder which is concentric to the spindle axis. The measuring arrangement shown in FIG. 12 differs from that shown in FIG. 2 only in that the elastically deformable webs in this case are formed as ring-shaped portions 8.4 of bellows 8.5 having a meander-like cross-section and connecting the inner element 7 with the ring 10 or 11. Two active strain gauges 15.1 and 15.2, or 15.3 and 15.4 are arranged at the outer circumference of each of the ring-shaped portions 8.4 and form a full bridge shown in FIG. 13.

Since the bellows 8.5 are fully closed at both axial ends of the inner element 7, the hollow space 18 in this case is fully protected from the ambient atmosphere. Because the mounting of the outer sleeve 12 is performed by electronic welding, that is, substantially without heating and other undesirable effects, the strain gauges 15.1, 15.2, 15.3 and 15.4 may be mounted in advance. The connecting wires can be inserted through a bore 11.1 in the ring 11. After welding of the outer sleeve 12 the strain gauges are accommodated in the hollow space 18 with full vacuum tightness. Since the strain gauges in the arrangement shown in FIG. 12, similarly to those shown in FIG. 8, are arranged in bending regions of the deformable parts a comparatively small force can be detected. It can be seen in FIG. 13 that in addition to the wires for voltage supply and the measuring wire, also wires for four points utilized for temperature compensation must extend through the bore 11.1.

Figure 14:
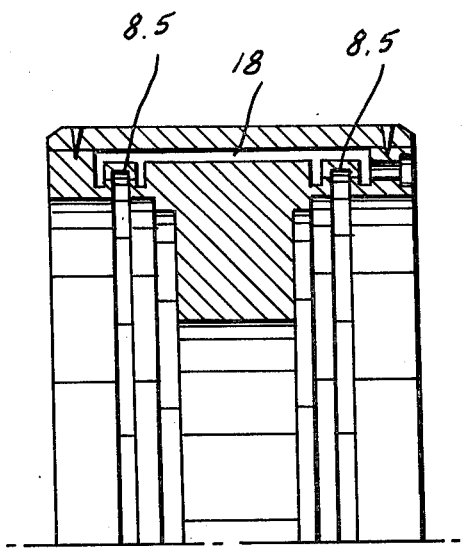
FIG. 14 is a view showing an arrangement which is similar to that shown in FIG. 12, but without annular diaphragms between an inner element and an outer element.
Figure 16:
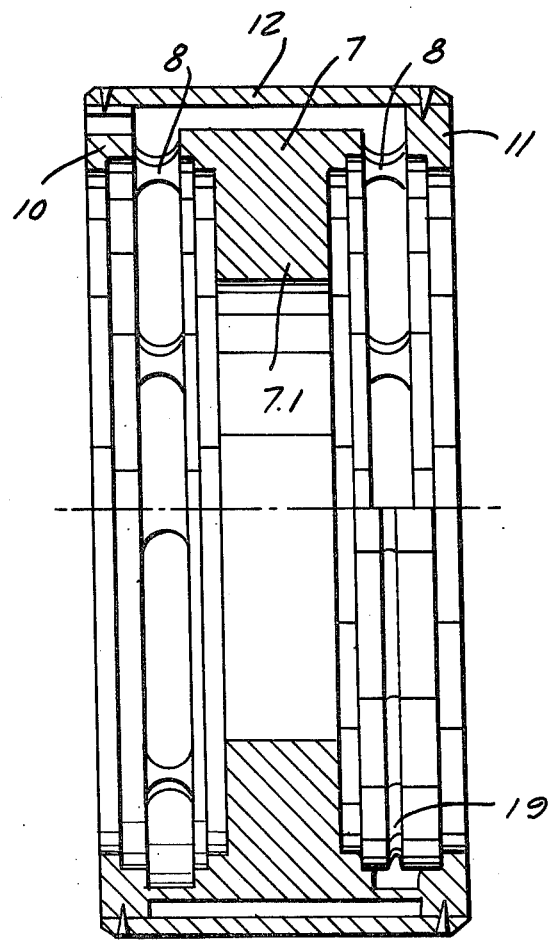
FIG. 16 is an arrangement which is used with the spindle bearing shown in FIG. 6.

FIG. 14 shows a measuring arrangement which differs from those shown in FIGS. 6 and 16 only in that instead of the web 8, bellows having a meander-like cross-section are provided similarly to the bellows used in the arrangement shown in FIG. 12. In this construction the hollow space 18 is again fully closed so that the strain gauges can be fully protected from the ambient atmosphere.

Figure 15:
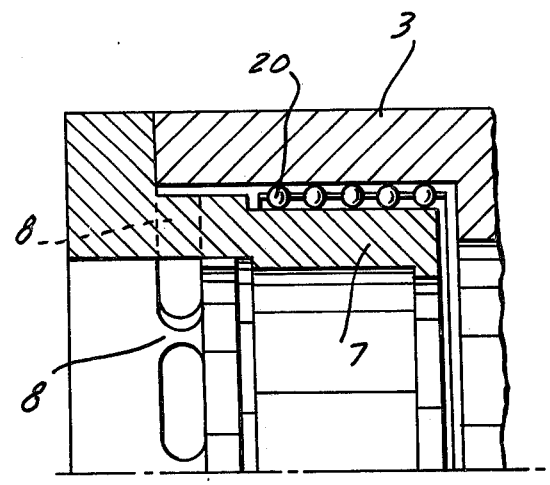
FIG. 15 is a view showing means for guiding an inner element of the arrangement in a spindle housing.

FIG. 16 shows an arrangement with the webs 8, which can again assure fully encasing of the strain gauges and wherein a diaphragm ring 19 is vacuumtightly mounted on an inner side of the deformable web 8. The diaphragm is easily deformable to the extent that it forms a further path for the transmission of force so as not to interfere with overall operation. In the arrangement shown in FIG. 15 the inner element 7 is radially supported in the spindle housing 3 by a plurality of balls 20 connected by a yoke. The balls 20 serve the same purpose as the ring-shaped diaphragms 14 of the arrangement shown in FIG. 12. FIG. 15 also show that the deformable webs 8 are provided only at one of the axial ends of the inner element 7. It can also be seen in FIG. 15, that the webs 8 may also be so formed that they have a greater dimension in the radial direction, whereas their thickness in the circumferential direction is comparatively small.

The arrangement in accordance with the present invention may be used not only with tool spindles but also with other rotatable shaft-like members and parts, when it is desirable to measure and/or to monitor an axial force.

It will be understood that each of the elements described above, or two or more together, may also find a useful application in other types of constructions differing from the types described above.

While the invention has been illustrated and described as embodied in an arrangement for measuring and/or monitoring an axial force, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for measuring and/or monitoring an axial force applied to a shaft-like member having a longitudinal axis and supported in a housing by at least one roller bearing, comprising an inner sleeve-shaped element receiving the roller bearing of the shaft-like member and having two end portions spaced from one another in the direction of said longitudinal axis; an outer element connected with the housing of the shaft-like member; and an elastically deformable web with strain sensing means provided thereon, said web extending in said axial direction and connecting at least one of said end portions of said inner element with said outer element so as to support said inner element in the latter, whereby said web is deformed and said strain sensing means provided thereon are subjected to stresses under the action of an axial force applied to the shaft-like member.

2. The arrangement as defined in claim 1, wherein said shaft-like member is a tool spindle of a machine tool, and said housing is a housing of said tool spindle.

3. The arrangement as defined in claim 2, wherein said inner element, said outer element and said web together form an integral structure.

4. The arrangement as defined in claim 3, wherein said integral structure is a hollow cylinder concentric with said longitudinal axis of the shaft-like member and having openings, said web being defined between said openings.

5. The arrangement as defined in claim 1, wherein said strain sensing means are strain gauges.

6. The arrangement as defined in claim 1, wherein said inner element is substantially cylindrical.

7. The arrangement as defined in claim 1, wherein said inner element is further connected with said outer element by at least one annular diaphragm.

8. An arrangement for measuring and/or monitoring an axial force applied to a shaft-like member having a longitudinal axis and supported in a housing by at least one roller bearing, comprising an inner sleeve-shaped element receiving the roller bearing of the shaft-like member and having two end portions spaced from one another in the direction of said longitudinal axis; an outer element connected with the housing of the shaft-like member; and two elastically deformable webs provided with strain sensing means, one of said webs being arranged at one of said end portions of said inner element whereas the other web is arranged at the other end portion of said inner element so as to support the latter in said outer element.

9. The arrangement as defined in claim 8, wherein said inner element is connected with said outer element by at least one annular diaphragm.

10. The arrangement as defined in claim 9, wherein said diaphragm extends in a radial direction.

11. The arrangement as defined in claim 9, wherein said outer element includes an outer sleeve-shaped member and outer side members connected with said outer sleeve-shaped member and with said annular diaphragm.

12. The arrangement as defined in claim 11, wherein said outer sleeve-shaped member together with said outer side members and said diaphragm, on the one hand, and said inner element and said webs, on the other hand, bound hollow spaces.

13. The arrangement as defined in claim 11; and further comprising means for connecting said outer sleeve-shaped member with said outer side members and said annular diaphragm including electronic welds.

14. The arrangement as defined in claim 11; and further comprising means for connecting said outer sleeve-shaped member with said outer side members and said diaphragm including photonic welds.

15. The arrangement as defined in claim 11, wherein each of said webs is located between said inner element and a respective one of said outer side members and extends in said axial direction.

16. The arrangement as defined in claim 15, wherein each of said webs includes a plurality of web portions.

17. The arrangement as defined in claim 16, wherein each of said web portions have two ends spaced from one another, each of said web portions being connected at one end with said inner element by a first connecting web portion and being connected at its other end with a respective one of said outer side members by a second connecting web portion.

18. The arrangement as defined in claim 8, wherein each of said webs is formed by a portion of a bellows connecting said inner element with said outer element.

19. The arrangement as defined in claim 18, wherein said bellows is meander-shaped.

20. An arrangement for measuring and/or monitoring an axial force applied to a shaft-like member having a longitudinal axis and supported in a housing by two axial roller bearings spaced from one another in the direction of said longitudinal axis, comprising an inner sleeve-shaped element receiving the axial bearings of the shaft-like member and having a supporting ring-shaped projection located between said axial bearings and two end portions spaced from one another in said axial direction; an outer element connected with the housing of the shaft-like member; and an elastically deformable web arranged at at least one of said end portions of said inner element so as to support the latter in said outer element, and provided with strain sensing means.

21. The arrangement as defined in claim 18; and further comprising means for axially movably guiding said inner element in said housing, said guiding means including ball members.

* * * * *